United States Patent [19]

Belanger et al.

[11] Patent Number: 4,979,316
[45] Date of Patent: Dec. 25, 1990

[54] BOOSTER NOZZLE DRYER

[75] Inventors: James A. Belanger, Northville; Astley: Graham J., Novi, both of Mich.

[73] Assignee: Belanger, Inc., Northville, Mich.

[21] Appl. No.: 406,925

[22] Filed: Sep. 13, 1989

[51] Int. Cl.$^5$ .............................. F26B 19/00
[52] U.S. Cl. .................. 34/243 C; 15/316.1; 15/405
[58] Field of Search ............. 34/243 C; 15/316 R, 15/405

[56] References Cited

U.S. PATENT DOCUMENTS

| | | | |
|---|---|---|---|
| 2,949,678 | 8/1960 | Anderson | 15/405 |
| 3,806,985 | 4/1974 | Takeuchi | 15/405 |
| 3,808,703 | 5/1974 | Kamiya | 34/243 C |
| 4,265,029 | 5/1981 | Jenkins | 34/243 C |
| 4,683,668 | 8/1987 | Hondzinski et al. | 34/243 C |
| 4,809,392 | 3/1989 | Larson et al. | 15/316 R |
| 4,817,301 | 4/1989 | Belanger et al. | 15/316 R |
| 4,848,670 | 7/1989 | Belanger et al. | 34/243 C |
| 4,872,238 | 10/1989 | Crotts et al. | 15/316 R |

*Primary Examiner*—Henry A. Bennet
*Assistant Examiner*—Denise L. F. Gromada
*Attorney, Agent, or Firm*—Dykema Gossett

[57] ABSTRACT

A portable and highly maneuverable nozzle dryer for assisting in the drying of vehicles and for covering difficult-to-reach areas and surfaces of the vehicle. The dryer includes a free standing support and a self-contained air nozzle assembly which is rotatably mounted to the support by a universal joint assembly. By combining the blower and nozzle housing into a one-piece design, efficient air movement is made possible. The booster dryer is portable and may be positioned at any location along the wash line to add drying power during high volume wash days. Moreover, the maneuverability of the dryer permits the positioning of the air outlet at any desired location to reach difficult drying areas or surfaces thereby reducing manpower requirements.

13 Claims, 1 Drawing Sheet

U.S. Patent  Dec. 25, 1990  4,979,316
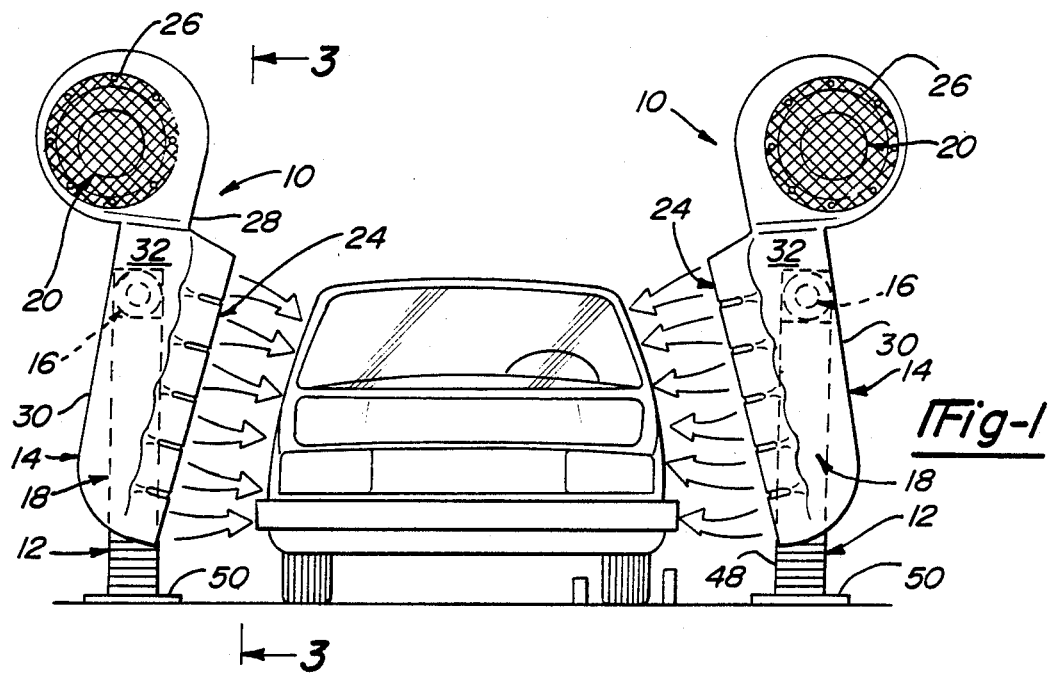
*Fig-1*
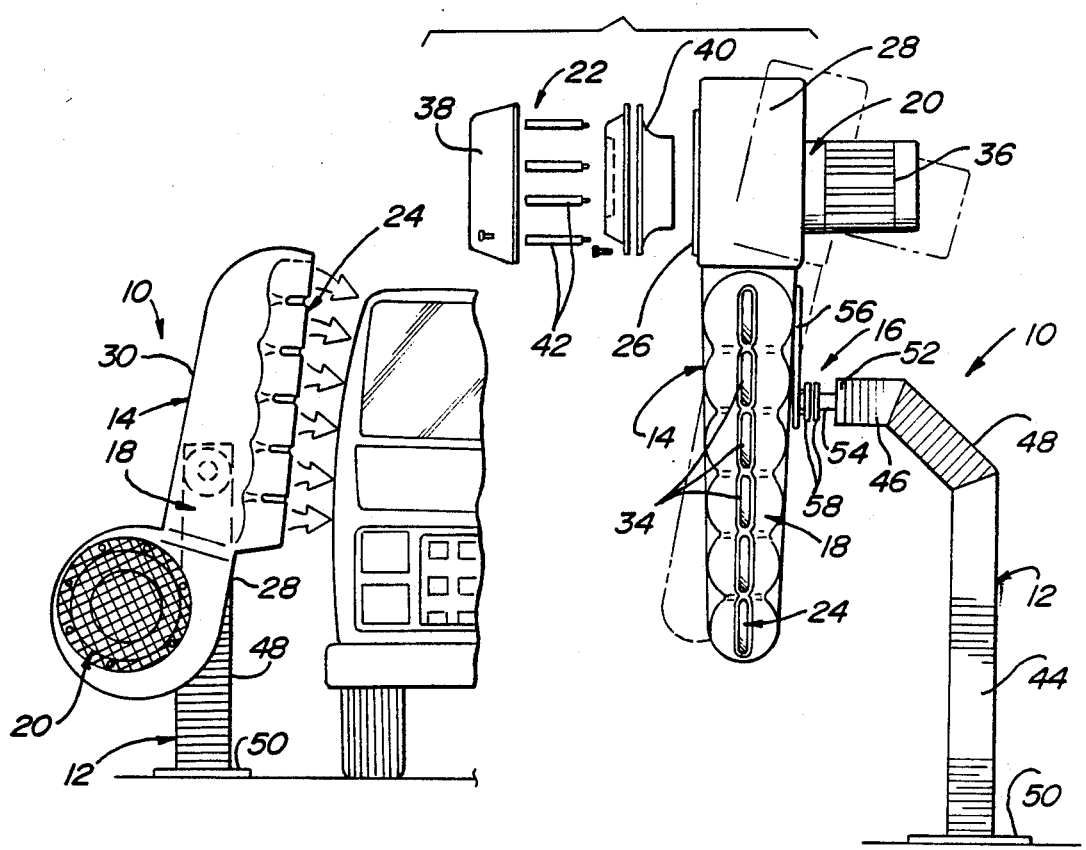
*Fig-2*  *Fig-3*

BOOSTER NOZZLE DRYER

BACKGROUND OF THE INVENTION

The present invention relates to a portable and highly maneuverable booster nozzle dryer for assisting in the drying of vehicles and for covering surface areas of the vehicle that may otherwise be missed.

It is well known to provide air nozzles which are adapted for blowing water off the surfaces of a vehicle that is moving through a vehicle wash. There are difficulties in efficiently and effectively removing water from a vehicle for proper drying to avoid spotting and streaking. For example, when the volume of vehicles being washed is high, it is difficult to maintain proper drying with normal drying equipment and manpower. Further, for vehicles such as vans, there is the need for a drying apparatus which may be positioned for drying the high sides of the van thereby saving detail manpower at the end of the wash line.

Another problem that is typically present in vehicle dryers results from interior obstructions within the air nozzles which make them noisy and inefficient. Further, there are always difficulties in mounting the air nozzle or nozzles within a framework so that they efficiently direct high velocity air onto the vehicle as it passes therethrough. Moreover, there are potential problems which may be encountered when an air nozzle comes into actual engagement with a vehicle surface.

Thus, the present invention is intended to provide a construction which may be adjusted for different vehicles passing through the car wash such that the nozzle assumes an efficient attitude with respect to the sides of the vehicle while remaining out of contact with the vehicle. More particularly, the booster nozzle dryer of the present invention may be positioned to add drying power to the sides of a vehicle during high volume car wash operations. Further, the booster nozzle dryer may be positioned for the high sides of a van type vehicle to save detail manpower at the end of the vehicle wash line. Therefore, the present invention provides an effective solution to several difficulties experienced with prior art constructions.

SUMMARY OF THE INVENTION

In accordance with the present invention, the booster nozzle dryer consists of a free standing support and a self contained air nozzle assembly which is rotatably mounted to the support by means of a universal joint assembly. The dryer may be set along the wash line at any desired location and is easily positioned to add drying power in any desired direction or location on the surfaces of the vehicle.

The air nozzle assembly consists of a nozzle housing which includes a blower, an air inlet assembly, and a tangential outlet. The nozzle housing is made as a unit molded body of a plastic material such as a high molecular weight polyethylene. The housing includes a plurality of walls forming an air chamber with an air inlet and an air outlet that is formed as a series of aligned throated orifices. Further, the blower includes an electric motor which powers a conventional impeller or blade that is contained within the housing. In operation, the motor operates the blade for drawing air through the inlet and directing pressurized air through the air outlet to surface portions of a vehicle. By combining the blower and nozzle housing into a one-piece design, efficient air movement is made possible. Further efficiency is made possible from the fluid air movement which enters the housing and is driven tangentially from the impeller through the throated orifices which are located along a substantial portion of the housing length.

The free standing support consists of a corrugated flexible body having a vertical portion and a generally horizontally extending arm portion. The support is mounted on a base which is portable such that it may be moved to any desired location along the floor of the wash line. A universal joint assembly is attached at one end to the generally horizontal arm portion of the support and at its opposite end to the air nozzle housing.

The booster nozzle dryer of the present invention is portable and may be positioned at any desired location to add drying power on the surfaces of vehicles during high volume wash days. Further, the universal joint of the dryer construction permits positioning of the air outlet at any desired location or attitude, including the high sides of a van-like vehicle, thereby saving detail manpower at the end of the wash line. The dryer of the present invention may be set next to each existing dryer station to boost the drying power or it may be easily maneuvered to reach difficult drying areas or surfaces thereby reducing man power requirements. Moreover, the dryer design including the location of the blower, air inlet, and air outlet provide more efficient air movement. These and other advantages and features of the present invention will become more apparent from the following specification.

BRIEF DESCRIPTION OF THE DRAWINGS

FIG. 1 is a side elevational view of a pair of the booster nozzle dryers of the present invention in association with a vehicle.

FIG. 2 is a side elevational view of the nozzle dryer for illustrating its maneuverability.

FIG. 3 is a front view of the nozzle dryer assembly of the present invention.

DETAILED DESCRIPTION OF THE INVENTION

Referring to FIGS. 1-3, the booster nozzle dryer construction 10 of the present invention is illustrated. The dryer construction includes a free standing support 12 and a self contained air nozzle assembly 14 which is rotatably mounted to support 12 by means of a universal joint assembly 16. As is readily apparent by a comparison between FIGS. 1 and 2, the air nozzle construction 10 may be set along the wash line at any desired location, and it is easily positioned to add drying power in any desired direction or location on the surfaces of the vehicle.

The air nozzle assembly 14 has a nozzle housing 18 which includes a blower 20, an air inlet assembly 22, and a tangential air outlet 24. Nozzle housing 18 is made as a unit molded body of a plastic material such as a high molecular weight polyethylene. Nozzle housing 18 includes an air inlet opening 26, a front wall 28, a rear wall 30, and opposed side walls 32. Integrally formed air outlet 24 is formed as a series of aligned throated orifices 34 which are in communication with the air chamber defined by walls 28-32.

Blower 20 includes an electric motor 36 which powers a conventional impeller or blade (not shown) that is contained within housing 18. The inlet assembly 22 includes a silencer cap 38 and an inlet ring 40 which are connected at the air inlet opening 26 by fasteners 42. In operation, motor 36 drives the internal impeller (not shown) which draws air through inlet opening 26 and thereafter directs pressurized air through air outlet 24 to surface portions of a vehicle. By combining the blower 20 and nozzle housing 18 into a one-piece design, efficient air movement is made possible. Further efficiency is made possible from the fluid air movement which enters the side of housing 18 and is driven tangentially from the motor operated impeller (not shown) for a pressurized exit through throated orifices 18, which are located along a substantial portion of the length of housing 18.

Free-standing support 12 includes a vertical portion 44 and a generally horizontally extending arm portion 46. Support 12 consists of a corrugated flexible body 48 which is mounted on base 50. Base 50 is portable such that it may be moved to any desired location along the floor of the wash line. Support 12 also includes an end portion 52 which supports one end of the universal joint assembly 16.

Universal joint assembly 16 includes a ball portion 54 that is fixed to end 52 of support 12. The remaining portion of assembly 16 is made up of support arm 56, which is attached to housing 18, and opposed bearing rings 58 into which ball 54 fits in a cooperative fashion to permit universal movement of housing 18 relative to support 12.

Referring to FIGS. 1-3, the booster nozzle dryer 10 of the present invention is portable and may be positioned at any location along the wash line to add drying power against the surfaces of vehicles during high volume wash days. Further, as shown in FIG. 2, the universal joint 16 of nozzle dryer 10 permits the positioning of the air outlet 24 at any desired location, including the high sides of a van-like vehicle, thereby saving detail manpower at the end of a wash line. A dryer 10 may be set next to each existing dryer station to boost the drying power and ensure dryer vehicles. Further, the dryer may be positioned for added drying performance on all vehicles or it can be maneuvered to reach difficult drying areas or surfaces thereby reducing manpower requirements. Moreover, by utilizing a plastic housing and combining the blower and nozzle into a one-piece design, as disclosed, more efficient air movement is provided.

As will be recognized by those skilled in the art, a working embodiment of the present invention has been disclosed, however, further modifications of the invention may be made without departing from the scope and content of the invention, which is defined by the appended claims.

We claim:

1. A vehicle dryer for drying a surface of a vehicle comprising:
    a free standing and portable support means extending to a base in contact with a static surface;
    a self-contained air nozzle assembly including a body having an air inlet, an air outlet, and blower means for drawing air through said inlet and directing air through said outlet; and
    joint means connecting said air nozzle assembly to said support means and permitting movement of said air nozzle assembly relative to said support means to a desired position with respect to a vehicle surface, said self-contained air nozzle assembly being pivotal relative to said support means about an axis extending parallel to a direction of vehicle travel through at least approximately 180 degrees.

2. The vehicle dryer as defined in claim 1 wherein said blower means is tangentially located relative to said air outlet.

3. The vehicle dryer as defined in claim 2 wherein said blower means is located at one end of said air nozzle body and said air outlet extends from the opposite end of said body towards said blower means.

4. The vehicle dryer as defined in claim 1 wherein said air nozzle body includes a pair of opposed side walls, said air inlet located in one side wall, and blower means including a motor mounted to the opposite side wall.

5. The vehicle dryer as defined in claim 1 wherein said air outlet is formed as a series of aligned orifices.

6. The vehicle dryer as defined in claim 1 wherein said air nozzle body is molded and consists of plastic material.

7. The vehicle dryer as defined in claim 5 wherein said orifices are located along a substantial length of said body.

8. The vehicle dryer as defined in claim 1 wherein said support means includes a vertical portion and a generally horizontal portion, said vertical portion mounted on a portable support base, and said joint means connected to said generally horizontal portion.

9. The vehicle dryer as defined in claim 1 wherein said support means includes a flexible body which is attached to a portable base at one end and to said joint means at its other end.

10. The vehicle dryer as defined in claim 1 wherein said joint means includes a ball portion and a bearing and said ball portion fitting into said bearing in a cooperative fashion to permit universal movement of said air nozzle assembly relative to a vehicle surface.

11. A vehicle dryer as recited in claim 1, wherein said joint means being a universal joint, and said self-contained air nozzle assembly being pivotable though 360 degrees relative to said support means.

12. A vehicle dryer for drying a surface of a vehicle as it proceeds along a path of travel comprising:
    a pair of free standing and portable support means;
    a self-contained air nozzle assembly including an inlet and an outlet, joint means connecting said air nozzle assembly to said support means and permitting movement of said air nozzle assembly relative to said support means to a desired position with respect to a vehicle surface, said self-contained air nozzle assemblies each being pivotal relative to said support means about an axis extending parallel to the vehicle path of travel through at least approximately 180 degrees; and
    one of said pair of free standing and portable support means being positioned on each lateral side of a vehicle path of travel, each of said pair of free standing and portable support means being individually portable.

13. A vehicle dryer as recited in claim 12, wherein said joint means being a universal joint, and said self-contained air nozzle assembly being pivotable through 360 degrees relative to said support means.

* * * * *